United States Patent
Bulin et al.

(10) Patent No.: US 8,925,295 B2
(45) Date of Patent: Jan. 6, 2015

(54) AIR DISCHARGING DEVICE FOR AN AIRCRAFT DOUBLE-FLOW TURBINE ENGINE

(75) Inventors: Guillaume Bulin, Blagnac (FR); Thierry Surply, Cornebarrieu (FR)

(73) Assignee: Airbus Operations, Toulouse (FR)

( * ) Notice: Subject to any disclaimer, the term of this patent is extended or adjusted under 35 U.S.C. 154(b) by 779 days.

(21) Appl. No.: 13/235,706

(22) Filed: Sep. 19, 2011

(65) Prior Publication Data
US 2012/0073262 A1 Mar. 29, 2012

(30) Foreign Application Priority Data
Sep. 23, 2010 (FR) ...................... 10 57661

(51) Int. Cl.
F02K 3/075 (2006.01)
F02K 1/12 (2006.01)
F02K 1/70 (2006.01)
B64D 29/00 (2006.01)
F02K 1/82 (2006.01)

(52) U.S. Cl.
CPC . *F02K 1/70* (2013.01); *B64D 29/00* (2013.01); *F02K 1/12* (2013.01); *F02K 1/827* (2013.01); *Y02T 50/671* (2013.01)
USPC .. 60/226.3; 60/232; 239/265.25; 239/265.27; 239/265.33

(58) Field of Classification Search
USPC ............. 60/226.2, 226.3, 230, 232, 229, 771; 239/265.19, 265.25, 265.27, 265.29, 239/265.33, 265.37, 265.39
See application file for complete search history.

(56) References Cited

U.S. PATENT DOCUMENTS

| | | | | |
|---|---|---|---|---|
| 5,040,730 A | * | 8/1991 | Hogie et al. | 239/265.23 |
| 5,799,903 A | * | 9/1998 | Vauchel | 244/110 B |
| 5,937,636 A | * | 8/1999 | Gonidec et al. | 60/226.2 |
| 5,983,625 A | | 11/1999 | Gonidec et al. | |

(Continued)

FOREIGN PATENT DOCUMENTS

| | | |
|---|---|---|
| EP | 0 764 779 A1 | 3/1997 |
| EP | 0 822 327 A1 | 2/1998 |
| EP | 0 882 882 A1 | 12/1998 |

(Continued)

OTHER PUBLICATIONS

French Preliminary Search Report issued on May 13, 2011, in Patent Application No. FR 1057661 (with Translation of Category of Cited Documents).

*Primary Examiner* — Andrew Nguyen
(74) *Attorney, Agent, or Firm* — Oblon, Spivak, McClelland, Maier & Neustadt, L.L.P.

(57) ABSTRACT

An air discharging device (20) for an aircraft turbine engine, comprising at least one door (24) displaceable between an open and a closed position of a corresponding orifice (30) and comprising two valves (26, 28), which delimit between them a conduit (68) for guiding a portion (74) of the secondary flow (76) outwards in the downstream direction, and which are integral with each other and are hinged around a pivot axis (58), so that in said open position, the upstream end of said internal valve (26) protrudes from the inner side relative to the internal surface (12), the downstream end of said external valve (28) protrudes from the external side relative to the external surface (14), and said internal valve (26) is spaced away from the fixed structure (22) so that an air passage exists downstream of said internal valve (26), between the latter and said fixed structure (22).

12 Claims, 2 Drawing Sheets

(56) References Cited

U.S. PATENT DOCUMENTS

| | | |
|---|---|---|
| 6,076,347 A | 6/2000 | Gonidec et al. |
| 6,082,096 A | 7/2000 | Vauchel |
| 6,151,886 A | 11/2000 | Vauchel |
| 6,158,211 A | 12/2000 | Gonidec et al. |
| 2009/0193789 A1 | 8/2009 | Pero |
| 2010/0139243 A1 | 6/2010 | Migliaro, Jr. |

FOREIGN PATENT DOCUMENTS

| | | |
|---|---|---|
| EP | 0 942 165 A1 | 9/1999 |
| EP | 0 947 688 A1 | 10/1999 |
| EP | 0 965 744 A1 | 12/1999 |
| FR | 2 146 109 | 3/1973 |
| WO | WO 03/036063 A2 | 5/2003 |
| WO | WO 2008/045050 A1 | 4/2008 |
| WO | WO 2008/045070 A1 | 4/2008 |

* cited by examiner

AIR DISCHARGING DEVICE FOR AN AIRCRAFT DOUBLE-FLOW TURBINE ENGINE

TECHNICAL FIELD

The present invention relates to an air discharging device for an aircraft double-flow turbine engine, of the type that can be incorporated into a turbine engine nacelle to allow, on command, a discharge of the secondary flow from the turbine engine, i.e. an increase in the output section of said secondary flow, by allowing part of said flow to escape through said device.

Air discharging devices of this type make it possible to increase the operating stability of the fan of turbine engines that are equipped with them, to facilitate changes in the speed of rotation of said fan, and correlatively to decrease the noise annoyance due to the fan, to more correctly size the latter and to reduce the fuel consumption of said turbine engines.

BACKGROUND OF THE INVENTION

Air discharging devices for aircraft double-flow turbine engines of the known type can be placed in two main categories:
- a first category for devices that use a translation, along the axis of the turbine engine, of an annular nacelle element such as a thrust reverser cowl, to alternatively expose or cover an opening usually assuming the form of a ring portion; and
- a second category for devices that comprise at least one element pivoting between an open position and a closed position of an orifice formed in the nacelle of the turbine engine.

In general, the devices in the first category have many drawbacks. The power necessary to activate them is indeed relatively high, these devices do not allow effective mastery of the noise annoyance, and it is in general difficult to guarantee sealing between the mobile parts of these devices.

The known devices of the second aforementioned category also have a certain number of drawbacks.

Patent application FR 2,146,109 describes an aircraft double-flow turbine engine comprising an annular row of air discharging devices each comprising two pivoting valves respectively closing the inner opening and the outer opening of an orifice passing through the turbine engine nacelle, as illustrated in FIG. 1 of the aforementioned document. The two pivot valves of each device are hinged to the nacelle at one of their upstream and downstream edges, so as to be able to pivot open in opposite directions, either completely as in FIG. 2 of the document, to perform the thrust reverser function, or partially as in FIG. 4, to perform the function of the air discharging device. The dual function of thrust reverser and air discharging device, as well as the independence of the two pivoting valves, requires the use of actuating means, such as electric jacks, which are numerous and powerful, which is detrimental to both the cost and mass of these devices and leaves little room for any sound-proofing fittings which are, however, necessary to reduce the sound annoyances emitted by the turbine engines.

Patent application WO 2008/045070 A1 illustrates a thrust reverser and air discharging device in which the two opposite pivoting valves are connected to each other by a complex mechanism of hinged connecting rods allowing the valves to be opened in opposite directions. In addition to the aforementioned drawbacks, this type of device has increased risks of failure due to the high complexity of the mechanism for actuating the pivoting valves.

Patent application WO 2008/045050 A1 illustrates an air discharging device in which the pivoting elements assume the form of fins arranged near the trailing edge of the turbine engine nacelle. Due to the small thickness of these fins, this device does not allow satisfactory joint use of actuators and acoustic insulation fittings. Furthermore, it is difficult to guarantee sealing between the fins.

BRIEF DESCRIPTION OF THE INVENTION

The invention in particular aims to provide a simple, economical and effective solution to these problems, making it possible to avoid at least some of the aforementioned drawbacks.

To that end, the invention proposes an air discharging device for an aircraft double-flow turbine engine, comprising a fixed structure having an internal surface intended to outwardly delimit an annular flow space for a secondary flow of a turbine engine downstream of a fan thereof, as well as an external surface intended for fairing the turbine engine. The device also comprises at least one door displaceable between an open position and a closed position of a corresponding orifice of the aforementioned fixed structure that passes through the inner and outer surfaces of this fixed structure, each door comprising two valves, an internal one and an external one, which respectively extend said internal and external surfaces of the fixed structure in said closed position, and which delimit between them a conduit intended, in the open position, for guiding a portion of the secondary flow outwards in the downstream direction.

According to the invention, the internal and external valves of each door are integral with each other and are hinged around a pivot axis remote from the internal valve of the door in a direction going from the external valve toward the internal valve of the door when the latter is in the closed position, so that in the open position of the door, the upstream end of said internal valve protrudes from the inner side relative to said internal surface of the fixed structure of the device, the downstream end of said external valve protrudes from the external side relative to said external surface of said fixed structure, and said internal valve is spaced away from said fixed structure so that an air passage exists downstream of said internal valve, between the latter and said fixed structure.

Due to the position of the pivot axis, when each door is in the open position, the internal valve of the door forms a scoop relative to the secondary flow from the turbine engine, while the downstream end of the external valve thus makes it possible to guide the air leaving the device.

In general, the fact that the two valves of each door are integral with each other makes it possible to simplify the actuating means of each door, as will appear more clearly below.

It should be noted that the air discharging device according to the invention can be an independent device, comprising a fixed structure and a removable door, and intended to be mounted in a housing provided to that end in an annular cowl of an aircraft turbine engine nacelle. Alternatively, this air discharging device can be incorporated into such an annular cowl, in which case the fixed structure of the device and said annular cowl are one.

Furthermore, the expression "annular nacelle cowl" must be understood here as being able to designate both a unitary annular piece making it possible to support a turbine engine and the internal surface of which defines the flow space for the secondary flow of the turbine engine while its external surface fairs the turbine engine, and an assembly formed by several annular pieces, for example comprising an internal annular structural support piece for a turbine engine, sometimes called OFS (Outer Fan Surface), and an annular fairing mounted on the aforementioned internal piece.

In general, simplifying the actuating means of each door in particular makes it possible to increase the space available for the acoustic insulation means.

This may involve acoustic insulation means incorporated into the fixed structure of the device.

Alternatively or complementarily, at least one of the internal and external valves of each door of the device incorporates acoustic insulation means.

In the preferred embodiment of the invention, the pivot axis of each door of the device is, relative to each of said internal and external valves of the door when the latter is in the closed position, situated away from the upstream and downstream ends of said valve so that the ratio of the lengths of the arcs of circle respectively described by said upstream and downstream ends of the valve during an opening of said door, is between 0.5 and 2.

Thus, in the open position of said door, the internal valve allows air to circulate toward the outside along both of its opposite faces simultaneously while forming a scoop as explained above.

In the preferred embodiment of the invention, the pivot axis of each door of the device is situated substantially at equal distances from the upstream and downstream ends of said external valve of the door when the latter is in the closed position.

In that case, the aforementioned ratio of the lengths of the arcs of circle respectively described by the upstream and downstream ends of said external valve during opening of said door is substantially equal to 1.

Furthermore, each door of the device advantageously includes two side walls connecting the internal and external valves of the door to each other.

In one preferred embodiment of the invention, the device comprises stop means limiting the opening of each door of the device so that in the open position, the internal surface of the fixed structure of the device extends beyond the upstream end of the external valve of each door of the device in the direction going from the external surface toward the internal surface of the fixed structure.

This in particular makes it possible to prevent the secondary air flow circulating upstream of each door from being disrupted by the external valve of the door.

In particular, when the fixed structure has two walls, internal and external, respectively, which are spaced away from each other, the stop means can, for each door of the device, be formed by a free edge, formed in the internal wall of the fixed structure of the device upstream of the corresponding orifice, and against which the upstream end of the external valve of the door abuts when the door is in the open position.

In the preferred embodiment of the invention, the external valve of each door extends in the downstream direction beyond the internal valve of the door, when the door is in the open position.

The external valve thus allows readhesion of the air flow leaving the device along the external surface and thus limits the aerodynamic disruptions, such as increased drag of the turbine engine, caused by the flow of the air leaving the device.

The fixed structure of the device advantageously comprises an internal cavity arranged between the internal and external surfaces of said fixed structure and in which actuating means for each door are housed, such as one or more control jacks.

Each door can thus be controlled by actuating means arranged nest to the door so as to best limit the disruptions of the air flow circulating through the door.

The device preferably comprises a single control jack for each door of this device, in order to best limit the bulk of the actuating means of each door. Each door can in fact be actuated by a single jack without it being necessary to use complex mechanisms, because the two valves of each door are integral with each other. The actuation of each door can thus be done using simple, reliable means that are not very bulky.

Each door of the device advantageously comprises at least one air guidance fin that extends between said internal and external valves of the door and that is curved in the downstream direction in the direction going from the external valve toward the internal valve of the door.

Such a fin makes it possible to improve the guidance of the air flow circulating in the door corresponding to the device, and in particular, to improve the readhesion of this air flow along the external surface of the fixed structure of the device and/or the nacelle equipped with said device, which makes it possible in particular to reduce the drag of the turbine engine.

Alternatively or complementarily, each door of the device comprises at least one intermediate wall extending between the internal and external valves of the door.

Such an intermediate wall also aims to improve the guidance of the flow of air circulating in each door of the device and the readhesion of said air flow along the external surface of the fixed structure of the device and/or the nacelle equipped with said device.

The invention also relates to an annular cowl for an aircraft double-flow turbine engine nacelle, which has an internal surface intended to outwardly define an annular flow space for the secondary flow of a turbine engine downstream of a fan thereof, and an external surface intended to fair the turbine engine, and which includes at least one air discharging device of the type described above, whereof the internal and external surfaces of the fixed structure respectively extend the internal and external surfaces of the cowl, or whereof the fixed structure is said cowl.

The annular nacelle cowl also advantageously comprises at least one thrust reverser device.

Each thrust reverser device of the annular cowl is preferably mounted at a small distance upstream of each air discharging device of said cowl.

The invention also relates to a nacelle for an aircraft with a dual-flow turbine engine, comprising an annular cowl of the type described above.

The invention also relates to an aircraft dual-flow turbine engine, comprising a nacelle of the type described above.

BRIEF DESCRIPTION OF THE DRAWINGS

The invention will be better understood, and other details, advantages and features thereof will appear upon reading the following non-limiting description done in reference to the appended drawings, in which.

In all of these figures, identical references can designate identical or similar elements.

DETAILED DESCRIPTION OF THE INVENTION

Figure 1:
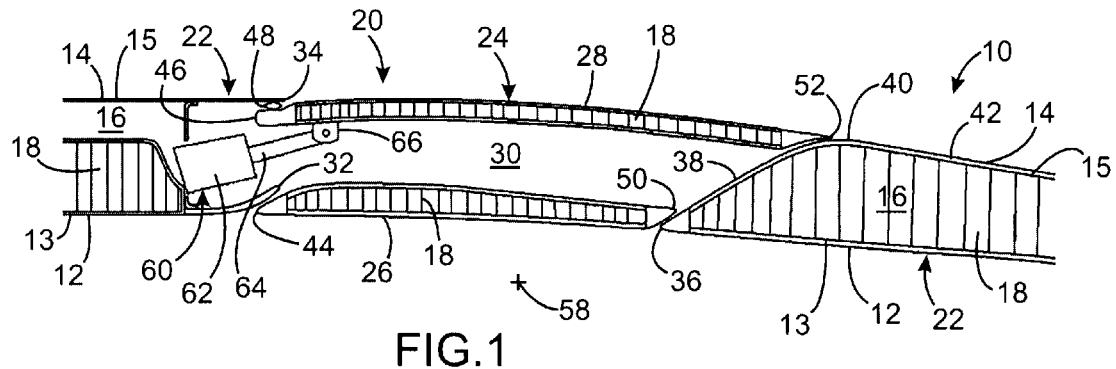
FIG. 1 is a partial diagrammatic view in axial cross-section of an aircraft dual-flow turbine engine, illustrating an air discharging device according to a first preferred embodiment of the invention, in the closed position.
Figure 2:
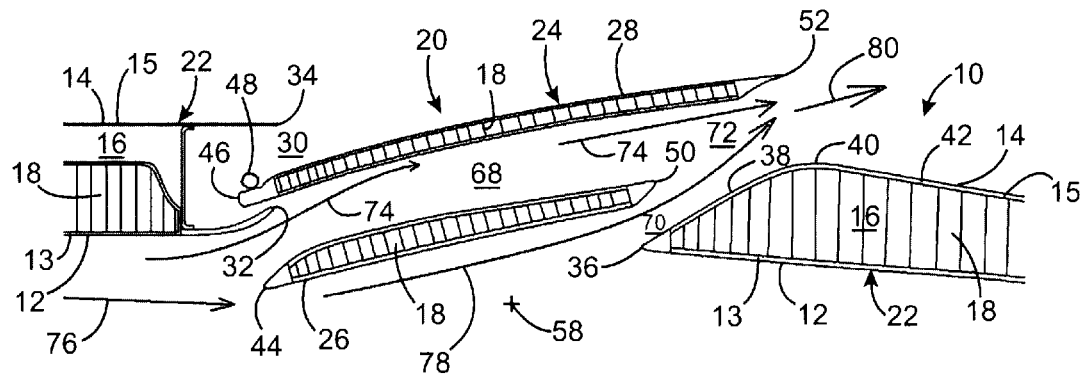
FIG. 2 is a view similar to FIG. 1, illustrating the air discharging device in the open position.
Figure 3:
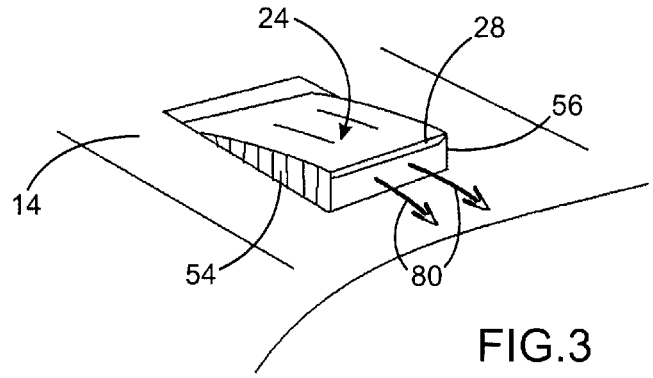
FIG. 3 is a partial diagrammatic perspective view of the aircraft turbine engine of FIG. 1, illustrating the air discharging device in the open position.

FIGS. 1 to 3 show part of an annular thrust reverser cowl 10 that is part of the nacelle of an aircraft dual-flow turbine engine according to one preferred embodiment of the invention.

The annular cowl 10 has two coaxial annular surfaces, an internal one 12 that outwardly defines an annular flow space for the secondary flow of the turbine engine, and an external one 14 that fairs the turbine engine. These two surfaces are formed on separate coaxial walls, an internal one 13 and an external one 15, respectively, between which a space 16 is formed in which acoustic insulation fittings 18 are arranged, which can occupy all or part of the transverse expanse of the space 16.

FIG. 1 more particularly illustrates an air discharging device 20 intended to allow, on command, an evacuation of part of the secondary flow through the annular cowl 10, the latter being able to comprise a plurality of devices of this type, for example distributed in an annular row around an axis of revolution of the cowl.

The device 20 comprises a fixed structure 22 that, in the example illustrated in FIG. 1, is constituted of the annular cowl 10 itself, as well as a pivoting door 24 including two valves, an internal one 26 and an external one 28, respectively, which ensure closing of an orifice 30 passing through the fixed structure 22 and emerging through internal 12 and external 14 surfaces of said fixed structure 22. Each of the valves 26 and 28 of the door 24 is formed by a hollow wall in which acoustic insulation fittings 18 are housed.

Although the device 20 in this example is completely incorporated into the annular cowl 10 of the nacelle, so that the fixed structure 22 of said device is said cowl 10, the air discharging device 20 can alternatively be separate from the annular cowl 10, in which case the cowl has at least one opening provided to house the air discharging device 20 so that respective internal and external surfaces of the fixed structure 22 of the device extend the internal 12 and external 14 surfaces of the annular cowl 10.

In the following, the internal 12 and external 14 surfaces as well as the walls 13 and 15 of the annular cowl 10 are those of the fixed structure 22 of the device 20.

As shown in FIG. 1, the orifice 30 of the fixed structure 22 of the device 20 is delimited on the upstream side by two respective free edges 32 and 34 of the internal 13 and external 15 walls of said fixed structure.

On the downstream side of the orifice 30, the external wall 15 of the fixed structure 22 of the device 20 is radially curved inward in the upstream direction so that one end of said external wall 15 and one end of the internal wall 13 of the fixed structure 22 come together to form a shared downstream end edge 36. The external wall 15 thus has an inclined part 38 that delimits the orifice 30 and extends in the downstream direction to an apex 40 of the external wall 15. Beyond this apex 40, the external wall 15 has a part 42 radially inclined toward the inside in the downstream direction and coming gradually closer to the internal wall 13 up to a trailing edge of the annular cowl 10 of the nacelle, not visible in the figures.

When the door 24 is in its closing position shown in FIG. 1, respective upstream ends 44 and 46 of the internal 26 and external 28 valves of said door 24 respectively bear against the internal faces of the internal 13 and external 15 walls of the fixed structure 22. An elastic sealing device 48 is fixed on the external face of the external valve 28 of the door 24, near the upstream end thereof, so as to be inserted between said valve 28 and the external wall 15 of the fixed structure 22.

Furthermore, respective downstream ends 50 and 52 of the internal 26 and external 28 valves of the door 24 bear against the inclined part 38 of the external wall 15, respectively near the downstream end edge 36 shared by the two walls 13 and 15 and near the apex 40 of the external wall 15. To that end, the external valve 28 of the door 24 extends in the downstream direction beyond the internal valve 26 of said door 24.

In general, when the door 24 is in a closing position of the orifice 30, the internal 26 and external 28 valves of said door respectively extend the internal 12 and external 14 surfaces of the fixed structure 22 so as to best limit the disruptions of the flow of air along those surfaces.

The two valves 26 and 28 of the door 24 are made integral with each other by two opposite side walls 54 and 56 (FIG. 3), and are rotatably mounted around a pivot axis 58 by traditional means, not shown in the figures, for example assuming the form of two side yokes fixed on the internal face of the internal valve 26 of the door 24.

As shown in FIGS. 1 and 2, the pivot axis 58 is positioned radially inwardly relative to the internal valve 26 of the door 24 and the internal surface 12 of the fixed structure 22. In other words, the pivot axis 58 is remote from the internal valve 26 of the door 24 in the direction going from the external valve 28 to the internal valve 26 of said door 24. Furthermore, this pivot axis 58 is situated substantially at the same distance from the upstream 46 and downstream 52 ends of the external valve 28 of the door 24. As a result, the ratio of the lengths of the arcs of circle respectively described by the upstream and downstream ends of said external valve 28 during opening of the door 24 is substantially equal to 1.

More generally, it should be noted that the ratio of the lengths of the arcs of circle, which are respectively described by the upstream and downstream ends of each of the internal 26 and external 28 valves during opening of the door 24, is between 0.5 and 2 in the described embodiment.

The air discharging device 20 also comprises a control jack 60, visible only in FIG. 1. This control jack 60 has a frame 62 fixed to the fixed structure 22 and housed in the space 16 formed between the internal 13 and external 15 walls of said fixed structure 22, as well as a translatable rod 64 articulated to a yoke 66 fixed on the internal face of the external valve 28 of the door 24.

In the example shown in the figures, the control jack 60 is arranged on the upstream side of the orifice 30 so that when the rod 64 of the jack is deployed, it keeps the door 64 in its closing position, whereas when the rod 64 retracts, it drives an upstream part of the external valve 28 of the door 24 with it and thereby causes the door 24 to pivot around the pivot axis 58 (FIG. 2).

As shown in FIG. 2, in the open position, the valves 26 and 28 of the door 24 delimit an air passage conduit 68 between them.

Furthermore, the downstream end of the internal valve 26 of the door 24 being spaced away from the inclined part 38 of the external wall 15 of the fixed structure 22, an additional air passage 70 exists between this internal valve 26 and said wall 15.

Furthermore, the upstream end 44 of the internal valve 26 protrudes inwardly relative to the internal surface 12 of the fixed structure 22 and thus forms an air withdrawal scoop. The internal valve 26 has a wing profile with an upper wing surface on the external side and an inner wing surface on the internal side of the door 24, which makes it possible to minimize the risks of aerodynamic separation of a nature to harm the performance of the turbine engine.

Furthermore, the downstream end 52 of the external valve 28 of the door 24 protrudes outwardly relative to the external surface 14 of the fixed structure 22. More precisely, the expanse in the downstream direction of the external valve 28 of the door 24 is such that the downstream end 52 of said valve is situated substantially at the apex 40 of the external wall 15 of the fixed structure 22 of the device 20. Thus, the external valve 28 delimits, with said external wall 15, an extension 72 in the downstream direction of the conduit 68 of the door 24, in which extension the aforementioned air passage 70 also emerges.

Furthermore, as appears in FIG. 2, the free edge 32 of the internal wall 13 of the fixed structure 22 forms an end-of-travel stop for the upstream end 46 of the external valve 28 of the door 24 in the open position.

During operation, upon a command to open the air discharging device 20 initially in the closing position as shown in FIG. 1, the rod 64 of the control jack 60 retracts, causing the door 24 to pivot around the pivot axis 58 to its open position of FIGS. 2 and 3. Part 74 of the secondary air flow 76 of the turbine engine then penetrates the conduit 68 of the door 24 while another part 78 of said air flow penetrates the air passage 70 downstream of the door 24. The two aforementioned parts 74 and 78 of the secondary flow come together again in the extension 72 of the conduit 68, then exit the turbine engine, as symbolized by arrow 80. Of course, the rest of the secondary flow continues to flow in the downstream direction in the turbine engine to leave through a nozzle, in a well-known manner.

The configuration of the external wall 15 of the fixed structure 22 of the device 20 downstream of the orifice 30 and the extension of the external valve 28 of the door 24 to the apex 40 of the external wall 15 favor a readhesion of the air flow 80 coming from the device 20 along the external wall 15, which makes it possible to best reduce the impact of opening of the device 20 on the drag of the turbine engine.

Furthermore, it should be noted that the internal surface 12 of the fixed structure 22 extends radially inwardly relative to the upstream end 46 of the external valve 28 of the door 24, so that the latter does not disrupt the flow the secondary air flow 76 in the turbine engine upstream of the orifice 30.

In general, the air discharging device 20 has the advantage of being able to be operated using simple means that are not very bulky and use relatively low power.

Figure 4:
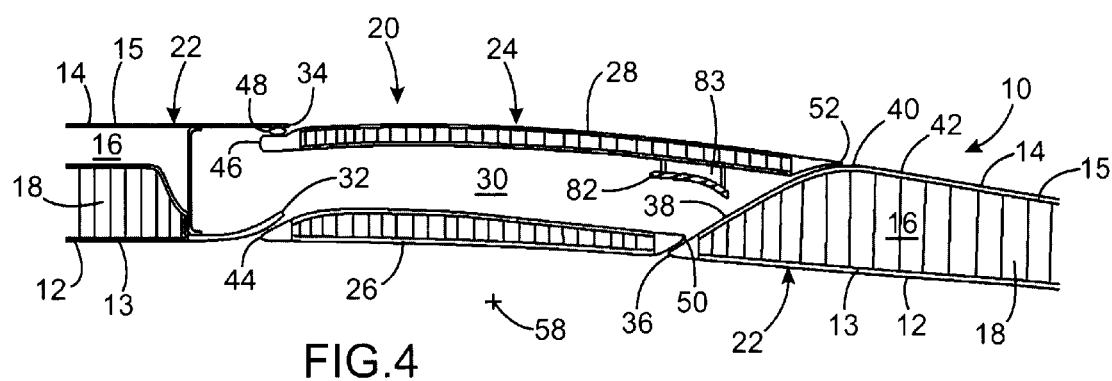
FIG. 4 is a partial diagrammatic view in axial cross-section of an aircraft double-flow turbine engine, illustrating an air discharging device according to a second preferred embodiment of the invention.

Alternatively, as illustrated in FIG. 4, the door 24 of the device 20 can also have one or more fins 82 extending between the two valves of the door to further improve the guidance of the air leaving the device. To that end, the fins 82 are preferably curved radially inwardly from upstream to downstream, as in FIG. 4.

In practice, the fins 82 can be fixed to either of the valves of the door 24. In the example illustrated in FIG. 4, the door 24 has a single fin 82 connected to the external valve 28 of the door via a wall 83 extending perpendicular to said valve.

Figure 5:
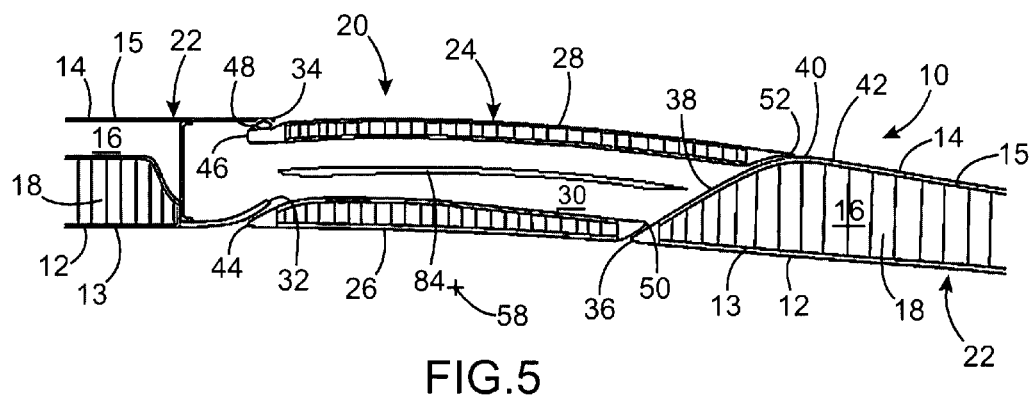
FIG. 5 is a partial diagrammatic view in axial cross-section of an aircraft dual-flow turbine engine, illustrating an air discharging device according to a third preferred embodiment of the invention.

Alternatively or complementarily, the door 24 of the device 20 can have an intermediate wall 84 extending between the internal 26 and external 28 valves of the door 24, substantially parallel to said valves, as illustrated in FIG. 5.

The invention claimed is:

1. An air discharging device for an aircraft double-flow turbine engine, comprising a fixed structure having an internal surface intended to outwardly delimit an annular flow space for a secondary flow of a turbine engine downstream of a fan thereof, as well as an external surface intended for fairing the turbine engine, the device also comprising at least one door displaceable between an open position and a closed position of a corresponding orifice of the fixed structure that passes through the internal and external surfaces of the this fixed structure, each door comprising two valves, an internal one and an external one, which respectively extend said internal and external surfaces of the fixed structure in said closed position, and which delimit between them a conduit intended, in the open position, for guiding a portion the secondary flow outwards in the aftward direction, wherein the internal and external valves of each door are integral with each other and are hinged around a pivot axis remote from the internal valve of the door in a direction going from the external valve toward the internal valve of the door when the door is in the closed position, so that in the open position of the door, the upstream end of said internal valve protrudes from an inner side relative to said internal surface of the fixed structure of the device, the downstream end of said external valve protrudes from an external side relative to said external surface of said fixed structure, and said internal valve is spaced away from said fixed structure so that an air passage exists downstream of said internal valve, between the internal valve and said fixed structure.

2. The device according to claim 1, wherein the pivot axis of each door of the device is, relative to each of said internal and external valves of the door when the door is in the closed position, situated away from the upstream and downstream ends of said valve so that the ratio of the lengths of the arcs of circle respectively described by said upstream and downstream ends of the valve during an opening of said door, is between 0.5 and 2.

3. The device according to claim 1, wherein the pivot axis of each door of the device is situated substantially at equal distances from the upstream and downstream ends of said external valve of the door when the door is in the closed position.

4. The device according to claim 1, wherein each door of the device includes two side walls connecting the internal and external valves of the door to each other.

5. The device according to claim 1, comprising stop means limiting the opening of each door of the device so that in the open position, the internal surface of the fixed structure of the device extends beyond the upstream end of the external valve of each door of the device in the direction going from the external surface toward the internal surface of the fixed structure.

6. The device according to claim 1, wherein said external valve of each door extends in the downstream direction beyond the internal valve of the door, when the door is in the open position.

7. The device according to claim 1, wherein the fixed structure of the device comprises an internal cavity arranged between the internal and external surfaces of said fixed structure and in which actuating means for each door are housed.

8. The device according to claim 1, wherein each door of the device comprises at least one air guidance fin that extends between said internal and external valves of the door and that is curved in the downstream direction in the direction going from the external valve toward the internal valve of the door.

9. An annular cowl for an aircraft double-flow turbine engine nacelle, having an internal surface intended to outwardly define an annular flow space for a secondary flow of a turbine engine downstream of a fan thereof, and an external surface intended to fair the turbine engine, said cowl comprising at least one air discharging device according to claim 1, wherein the internal and external surfaces of the fixed structure respectively extend the internal and external surfaces of the cowl, or wherein the fixed structure is said cowl.

10. The annular cowl according to claim 9, also comprising at least one thrust reverser device.

11. A nacelle for an aircraft with a dual- flow turbine engine, comprising an annular cowl according to claim 9 or 10.

12. An aircraft dual-flow turbine engine, comprising a nacelle according to claim 11.

\* \* \* \* \*